(12) United States Patent
Graham et al.

(10) Patent No.: US 10,184,387 B2
(45) Date of Patent: Jan. 22, 2019

(54) REMANUFACTURED PRECHAMBER DEVICE AND METHOD

(71) Applicant: Caterpillar Inc., Peoria, IL (US)

(72) Inventors: Curtis Graham, Peoria, IL (US); Kegan Luick, Corinth, MS (US); Daniel Cavanaugh, Chillicothe, IL (US); Darryl Hatfield, Boonesville, MS (US)

(73) Assignee: Caterpillar Inc., Deerfield, IL (US)

( * ) Notice: Subject to any disclaimer, the term of this patent is extended or adjusted under 35 U.S.C. 154(b) by 78 days.

(21) Appl. No.: 15/418,437

(22) Filed: Jan. 27, 2017

(65) Prior Publication Data

US 2018/0216518 A1    Aug. 2, 2018

(51) Int. Cl.

| | |
|---|---|
| *B23K 31/02* | (2006.01) |
| *F02B 19/18* | (2006.01) |
| *B23K 26/211* | (2014.01) |
| *B23K 26/32* | (2014.01) |
| *B23K 1/00* | (2006.01) |
| *B23K 26/00* | (2014.01) |
| *B23K 26/14* | (2014.01) |
| *B23K 26/34* | (2014.01) |
| *B23K 26/144* | (2014.01) |
| *B23K 26/60* | (2014.01) |
| *B23K 101/00* | (2006.01) |
| *B23K 103/04* | (2006.01) |
| *B23K 103/18* | (2006.01) |

(52) U.S. Cl.
CPC ............. *F02B 19/18* (2013.01); *B23K 1/00* (2013.01); *B23K 26/0006* (2013.01); *B23K 26/144* (2015.10); *B23K 26/147* (2013.01); *B23K 26/211* (2015.10); *B23K 26/32* (2013.01); *B23K 26/34* (2013.01); *B23K 26/60* (2015.10); *B23K 2101/003* (2018.08); *B23K 2101/006* (2018.08); *B23K 2103/05* (2018.08); *B23K 2103/26* (2018.08)

(58) Field of Classification Search
CPC .......................................... F02B 19/00–19/18
See application file for complete search history.

(56) References Cited

U.S. PATENT DOCUMENTS

| | | | | |
|---|---|---|---|---|
| 2,148,505 A | * | 2/1939 | Rosen ..................... | F02B 19/14 |
| | | | | 123/275 |
| 3,087,473 A | * | 4/1963 | Thompson ............ | F01L 1/0532 |
| | | | | 123/193.1 |

(Continued)

FOREIGN PATENT DOCUMENTS

| | | | | | |
|---|---|---|---|---|---|
| GB | | 359808 A | * | 10/1931 | ............. F02B 19/08 |
| JP | | 2012114077 A | * | 6/2012 | ............. H01T 13/54 |

(Continued)

*Primary Examiner* — Kiley S Stoner
(74) *Attorney, Agent, or Firm* — Jonathan F. Yates (57) ABSTRACT

A prechamber ignition assembly for an internal combustion engine includes a base attached to a remanufactured prechamber ignition device at a base weld interface. The remanufactured prechamber ignition device includes a new tip formed of a tip material, and a root formed of a root material, with a used body formed of a body material disposed therebetween. The new tip is bonded to the used body at a tip weld interface and the root is bonded to the used body at a root weld interface.

9 Claims, 5 Drawing Sheets

(56) References Cited

U.S. PATENT DOCUMENTS

| | | | | |
|---|---|---|---|---|
| 3,213,839 | A | * | 10/1965 | Gitlin .................. F02B 19/1004 123/143 A |
| 3,449,816 | A | * | 6/1969 | Swick ...................... B23G 7/00 228/119 |
| 4,440,339 | A | * | 4/1984 | Tamai ...................... G21C 7/10 138/97 |
| 4,458,125 | A | * | 7/1984 | Leis .......................... B23P 6/00 219/603 |
| 4,844,322 | A | * | 7/1989 | Flowers .............. F16L 55/1608 228/119 |
| 5,024,193 | A | * | 6/1991 | Graze, Jr. ........... F02D 41/0027 123/259 |
| 5,425,337 | A | * | 6/1995 | Matsuoka ............... F02B 19/14 123/262 |
| 5,554,908 | A | | 9/1996 | Kuhnert et al. |
| 5,934,244 | A | | 8/1999 | Walenta et al. |
| 9,370,845 | B2 | | 6/2016 | Shaw |
| 9,371,771 | B2 | | 6/2016 | Lee et al. |
| 9,631,579 | B1 | * | 4/2017 | Powers .............. F02M 21/0218 |
| 9,739,192 | B2 | * | 8/2017 | Willi ....................... F02B 19/08 |
| 9,874,135 | B2 | * | 1/2018 | Sotiropoulou ...... F02B 19/1014 |
| 2002/0014005 | A1 | * | 2/2002 | Niessner ................. H01T 13/39 29/860 |
| 2002/0104507 | A1 | * | 8/2002 | Riggs ..................... F02B 19/12 123/266 |
| 2007/0169740 | A1 | * | 7/2007 | Riggs .................. F02B 19/1004 123/266 |
| 2011/0146618 | A1 | * | 6/2011 | LaPointe ................. F02B 19/12 123/266 |
| 2013/0206122 | A1 | * | 8/2013 | Chiera .................... H01T 13/54 123/594 |
| 2014/0165958 | A1 | * | 6/2014 | Lee ......................... F02B 19/12 123/260 |
| 2014/0209057 | A1 | * | 7/2014 | Pouring ................. F02B 19/12 123/257 |
| 2015/0020386 | A1 | * | 1/2015 | Shaw ...................... F02F 1/242 29/888.011 |
| 2016/0024995 | A1 | * | 1/2016 | Trinkel ................... F02B 19/16 123/260 |
| 2016/0230646 | A1 | * | 8/2016 | Kim ........................ F02B 19/18 |
| 2016/0237879 | A1 | * | 8/2016 | Rowan ............... F02B 19/1009 |
| 2016/0319791 | A1 | * | 11/2016 | Willi ........................... F02F 1/36 |
| 2016/0326946 | A1 | * | 11/2016 | Willi ....................... F02B 19/08 |
| 2016/0333771 | A1 | * | 11/2016 | Willi ................... F02B 19/1004 |
| 2016/0348570 | A1 | * | 12/2016 | Willi ....................... F02B 19/18 |
| 2017/0226922 | A1 | * | 8/2017 | Tozzi ..................... F02B 19/08 |
| 2017/0284320 | A1 | * | 10/2017 | Holst ..................... F02P 5/1502 |
| 2018/0058305 | A1 | * | 3/2018 | Graham ............. F02B 19/1009 |
| 2018/0106182 | A1 | * | 4/2018 | Graham ............... F02B 19/12 |

FOREIGN PATENT DOCUMENTS

| | | | | |
|---|---|---|---|---|
| JP | | 2014139951 A | * 7/2014 | ............ H01T 13/54 |
| WO | WO 03/071644 A1 | * | 8/2003 | |

* cited by examiner

REMANUFACTURED PRECHAMBER DEVICE AND METHOD

TECHNICAL FIELD

The present disclosure relates generally to a prechamber ignition device and, more particularly, to remanufacturing prechamber ignition devices to address corrosion produced during service in an internal combustion engine.

BACKGROUND

Combustion engines, including gasoline spark-ignited engines, diesel compression ignition engines, gaseous fuel engines, and still others, operate generally by producing a controlled combustion reaction within a cylinder which drives a piston to rotate a crankshaft. This basic technique has been used to operate engines with traditional fuels such as gasoline or diesel for well over a century. Emissions concerns, price and supply concerns, amongst others, have led to increased interest and exploitation of alternative engine fuels such as natural gas, hydrogen, landfill gas, and biogas. These fuels typically are used at a higher stoichiometric air-to-fuel ratio, meaning so-called "lean" fuel/air mixtures, or mixtures having an equivalence ratio less than 1, are common. A traditional combustion engine ignition strategy that relies on spark ignition or compression ignition may fail to properly ignite such mixtures resulting in engine knock or other problems.

Use of a prechamber ignition device can address these issues by igniting a fuel/air mixture in a prechamber before delivering jets of hot combustion gases to the combustion chamber to locally raise temperature and pressure to an ignition threshold, resulting in a hotter, more uniform, and more robust combustion reaction as compared to other techniques. Typically, a prechamber device is deployed for use in an engine as part of a prechamber assembly, which is often constructed of a base formed of cast iron or steel, and the prechamber device coupled thereto. The prechamber device is typically formed of materials well-suited to withstanding regular and intense combustion reactions, such as certain alloys available under the tradename Inconel®.

While the use of a prechamber device provides certain advantages, prechamber devices can also require periodic replacement as the harsh conditions presented by combustion reactions within the prechamber, and other factors, may result in production of corrosion on or within the device. Corrosion of the outlets through which gases from the prechamber are conveyed to the cylinder can ultimately affect combustion performance of the engine amongst other things.

One attempt at removing corrosion to extend the life of a prechamber is disclosed in U.S. Pat. No. 9,371,771 to Lee et al. ("Lee"). Lee discloses a prechamber assembly for gasoline engines having removable and replaceable components, allowing for damaged or corroded parts to be repaired or replaced individually rather than the assembly as a whole. While this and other solutions may extend the life of a prechamber device in certain engine applications, such concepts may be less well suited for other engine applications or engine types, which can involve harsher operating conditions in certain respects. Accordingly, there remains ample room for improvement in this field.

SUMMARY OF THE INVENTION

In one aspect, a prechamber ignition assembly for an internal combustion engine is disclosed. The assembly includes a remanufactured prechamber device that has a body formed of a body material and a tip formed of a tip material. The prechamber device defines a longitudinal axis extending between a proximal end and a distal end with the proximal end being on the body and the distal end being on the tip, the tip being attached to the body at a tip weld interface. A base is coupled to the proximal end. The prechamber device further includes an outer surface and an inner surface, each formed in part upon the body and in part upon the tip. The inner surface also defines a prechamber and the tip defines at least one ignition outlet extending from the inner surface to the outer surface to convey combustion gases from the prechamber into an engine cylinder.

In another aspect, a method of making a prechamber device for an internal combustion engine includes receiving a used prechamber ignition assembly removed from service in an internal combustion engine. The used prechamber ignition assembly includes a used prechamber device having a prechamber body structured for positioning at least partially within an engine cylinder, and a base coupled to the prechamber device body for mounting the prechamber ignition assembly in the internal combustion engine. The method further includes removing a used tip from the body of the used prechamber device that defines at least one ignition outlet for conveying combustion gases from within the prechamber device into the engine cylinder, attaching a new tip to the body in place of the used tip, the new tip being formed of a tip material compatible for welding with a body material of the body, and forming at least one new ignition outlet in the new tip.

In still another aspect, a prechamber device for an internal combustion engine includes a body having an elongate tubular shape and defining a longitudinal axis, the body having a side port formed therein for receiving a sparkplug and being formed of a body material. The prechamber device also includes a tip formed of a tip material, and being attached to the body at a tip weld interface. The prechamber device further includes an outer surface and an inner surface, each formed in part upon the body and in part upon the tip, the inner surface defining a prechamber in fluid communication with the side port. The prechamber device further includes at least one ignition outlet formed in the tip that extends from the inner surface to the outer surface so as to form a fluid path for combustion gases ignited within the prechamber and conveyed into a cylinder in an internal combustion engine.

DETAILED DESCRIPTION

Figure 1:
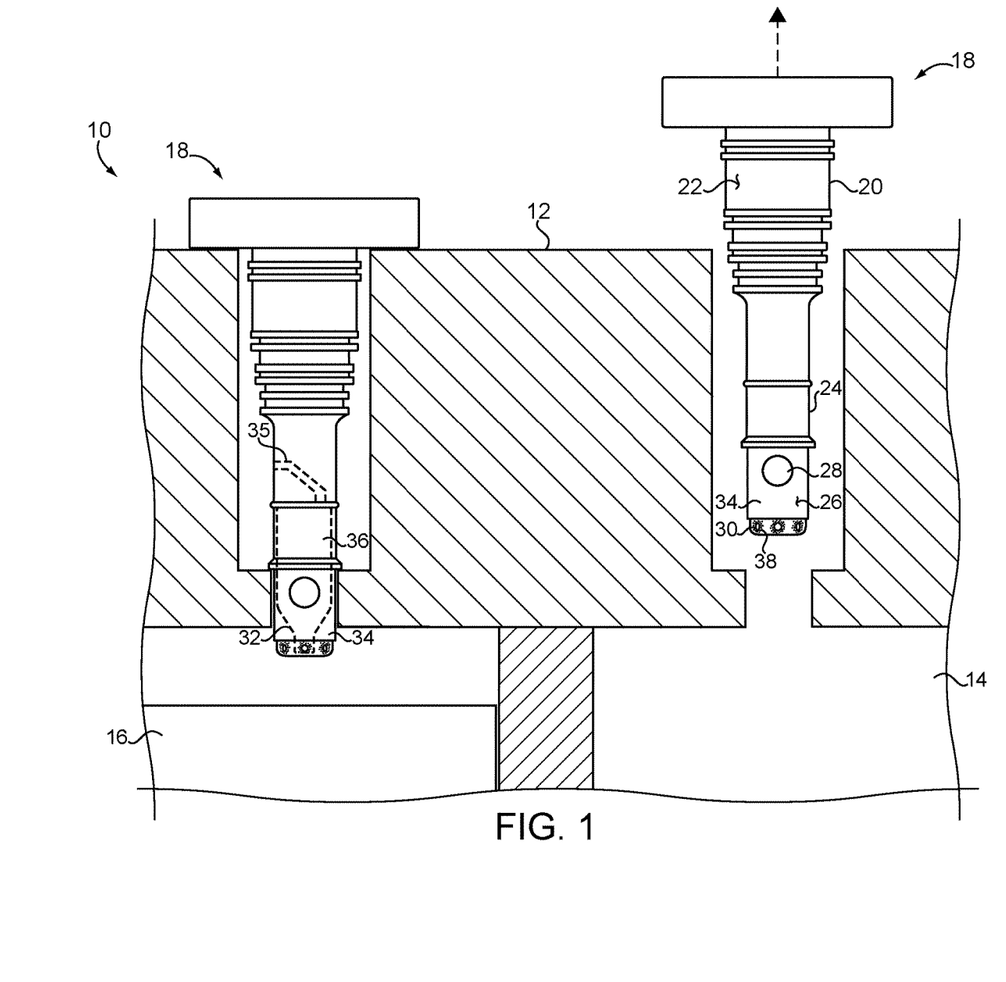
FIG. 1 is a sectioned diagrammatic view of a portion of an engine that has been partially disassembled, according to one embodiment.

Referring to FIG. 1, there is shown a partial view of an internal combustion engine 10 according to one embodiment. Engine 10 includes a housing 12, which defines an engine cylinder 14 having a piston 16 housed therein. Housing 12 may be structured to receive one or more prechamber ignition assemblies 18. Each prechamber ignition assembly (hereinafter "prechamber assembly") 18 may be a used prechamber assembly 18. Descriptions herein of prechamber assembly 18 in the singular shall be understood to refer generally and in a like manner to any of the prechamber assemblies in engine 10. Prechamber assembly 18 may have a base 20 formed of a base material 22, for mounting prechamber assembly 18 in engine 10, and a prechamber device 24 formed of a body material 26 coupled to base 20. Prechamber device 24 may further include a body 52 having a tip 50 with at least one ignition outlet 30 formed therein. Ignition outlet 30 may extend from an inner surface 32, which may define a prechamber 36, to an outer surface 34. Housing 12 may be structured to receive prechamber assembly 18 such that used tip 50 is positioned at least partially within cylinder 14. Positioning used tip 50 within cylinder 14 allows cylinder 14 to be in fluid communication with prechamber 36 by way of ignition outlets 30 that are structured to convey combustion gases from the prechamber 36 into engine cylinder 14. Prechamber device 24 may also have a side port 28 structured to receive a sparkplug (not pictured). Prechamber assembly 18 may be structured to receive a fuel, such as diesel fuel, a gaseous fuel such as natural gas, or another fuel, from a fuel supply (not pictured). The fuel may be conveyed by a fuel conduit 35 to prechamber 36. In some embodiments, the fuel may be mixed with air and conveyed to prechamber 36 by an air conduit (not pictured) for combustion. In a practical implementation strategy, however, air for prechamber combustion may be drawn through ignition outlets 30. The air-fuel mixture in prechamber 36 may be ignited by a spark from the sparkplug. In alternative embodiments, the mixture may be ignited by other means such as pressurizing the mixture until autoignition occurs. Combustion results in combustion gases rapidly expanding in prechamber 36, escaping via ignition outlets 30 to cylinder 14. Combustion of fuel or fuel mixtures in cylinder 14 causes a rapid pressure rise in cylinder 14, which drives piston 16 from a top dead center position to a bottom dead center position to rotate a crankshaft (not pictured) in a conventional manner.

Figure 2:
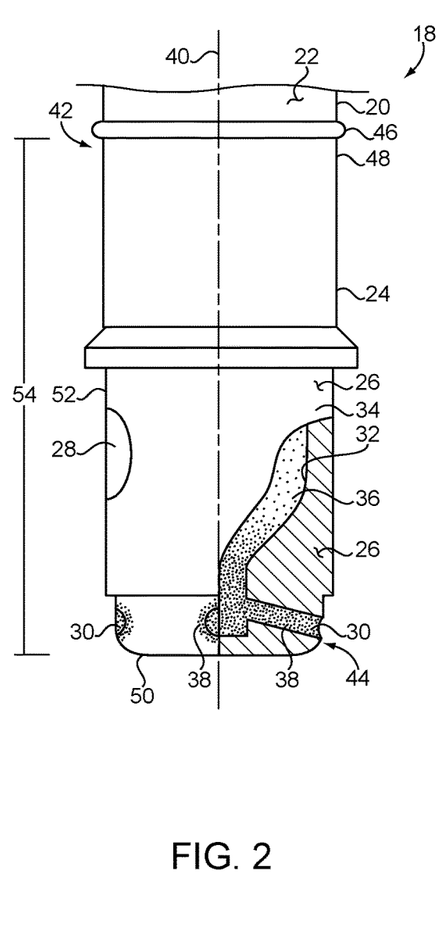
FIG. 2 is a partially sectioned diagrammatic view of a used prechamber device suitable for remanufacturing, according to one embodiment.

It has been observed that, in the normal course of operation, repeated combustion reactions in prechamber 36, which may number in the millions or perhaps even higher over the course of a service life of engine 10, may cause used prechamber device 24 to become corroded. Deposits of corrosion 38 on surfaces 32, 34 of used prechamber device 24 have further been observed to risk detrimentally impacting engine performance by affecting flow of combustion gases through ignition outlets 30, potentially producing free corrosion particulates, causing premature failure of prechamber device 24, or still other problems. Due to such risks and concerns, prechamber assembly 18 may need to be prematurely removed from service for replacement or, once removed in the usual course, be unsuited for returning to service. The presence of corrosion 38 may violate formal or informal specifications for a new prechamber device and/or prechamber assembly. It may be desirable or mandatory that all surfaces be free or substantially free from corrosion. Referring now also to FIG. 2, a partially sectioned close-up view of prechamber assembly 18 that has been removed from service is shown. Prechamber device 24 may have a longitudinal axis 40 extending between a proximal end 42 and a distal end 44 of prechamber device 24. In FIG. 2 it can be seen that prechamber device 24 and base 20 may be separate pieces attached by welding. In alternative embodiments, base 20 and prechamber device 24 might be attached by other means, for example, fasteners, threads, interference fits, or still other strategies.

Figure 3:
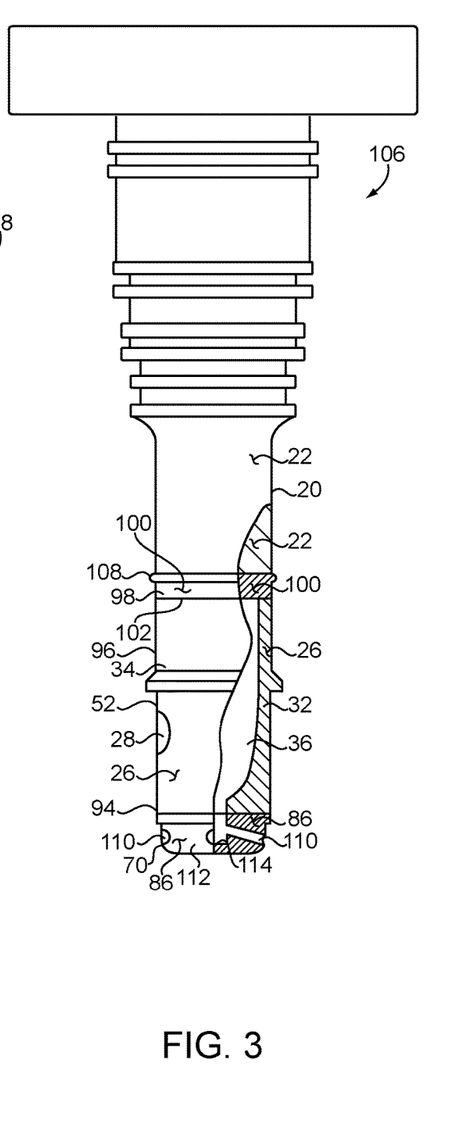
FIG. 3 is a diagrammatic view of a remanufactured prechamber assembly at one stage of processing for remanufacturing, according to one embodiment.

Referring now also to FIG. 3, a partially sectioned remanufactured prechamber assembly (hereinafter "remanufactured assembly") 106 is shown. Remanufactured assembly 106 may be formed by attaching a remanufactured prechamber ignition device (hereinafter "remanufactured device") 96 having a new tip 70 and a root 98 to base 20 by laser welding to form a new base weld interface 108. New base weld interface 108 may include a mixture of base material 22 and a root material 100. In some embodiments, new base weld interface 108 may include a mixture of base material 22 and body material 26, which may be metallurgically bonded to each other. In alternative embodiments, remanufactured device 96 may be bonded to base 20 by any other means that is suitable, such as by friction welding.

Remanufactured assembly 106 of FIG. 3 may be substantially similar to prechamber assembly 18 of FIG. 1 except that remanufactured assembly 106 has a new remanufactured device 96 having at least some parts and/or materials that are used and some that are new. In some embodiments, prechamber assembly 18 may include a used remanufactured device. In other words, prechamber assembly 18 itself may have already been remanufactured at least once. The sectioning in FIG. 3 illustrates different materials that may comprise remanufactured assembly 106. Base 20 may include base material 22, while remanufactured device 96 may include root material 100, body material 26, and a tip material 86. As will be apparent from the following description, root material 100, tip material 86, and body material 26 may be the same type, formulation, or class of materials but in slightly different forms. In the present embodiment, root material 100 and tip material 86 may have identical material compositions, and may be new material. Body material 26 of the present embodiment may have an identical material composition to root material 100 and tip material 86 but body material 26 may be used material salvaged from used prechamber device 24. As a result of the different manner in which the several materials are deposited and/or subjected to environmental conditions, materials 26, 86, 100 might have different microstructures detectable microscopically, or exhibit other distinguishing features that are visible only with the assistance of microscopy, or other destructive or non-destructive inspection techniques. Moreover, the various weld interfaces described herein may be visible with the assistance of microscopy or potentially also to the unaided eye.

Due at least in part to lean-burning operation, gases conveyed through ignition outlets 30, during combustion initiation and/or other phases of an engine cycle, may produce corrosion 38 on surfaces 32, 34 of prechamber device 24. According to conventional wisdom, repair or refurbishment of used prechamber devices 24 may not be possible, leading to used prechamber devices 24 being discarded and replaced instead of being repaired. Deposits of corrosion 38 on inner surfaces 32, such as prechamber 36 and ignition outlets 30, and outer surfaces 34 around ignition outlets 30 can be seen in FIG. 1 and FIG. 2. It has been discovered that corrosion concentration is often greater on inner and outer surfaces 32, 34 of used tip 50 than other surfaces of used prechamber device 24. Repair of corroded, used prechamber devices with sufficient quality to return to service has long been elusive, and it has been standard practice to replace rather than repair.

INDUSTRIAL APPLICABILITY

As suggested above, repair of used prechamber device 24 would likely be considered economically inefficient or altogether impracticable according to known techniques. Moreover, given some value as to salvaging used prechamber device 24 for scrap, the time and/or resources necessary to repair or refurbish corroded areas, if even possible, would be unlikely to be viewed as economically justified over the standard practice of replacing used prechamber devices 24 in their entirety. In the field of remanufacturing generally, it is typically desirable or even critical that remanufactured devices and/or components be returned to a state as good as or better than new, particularly with regard to geometric dimensioning and tolerancing, surface finish, and still other attributes. For this reason there are often disincentives to adopting any particular remanufacturing technique where adherence to such specifications would be compromised. According to the present disclosure, and as further discussed herein, the selective removal of used material and replacement with new material, enables restoration of a functional part returned to a state as good as or better than new without unduly burdensome requirements for holding tolerances or achieving other specifications at critical stages of processing.

Figure 4:
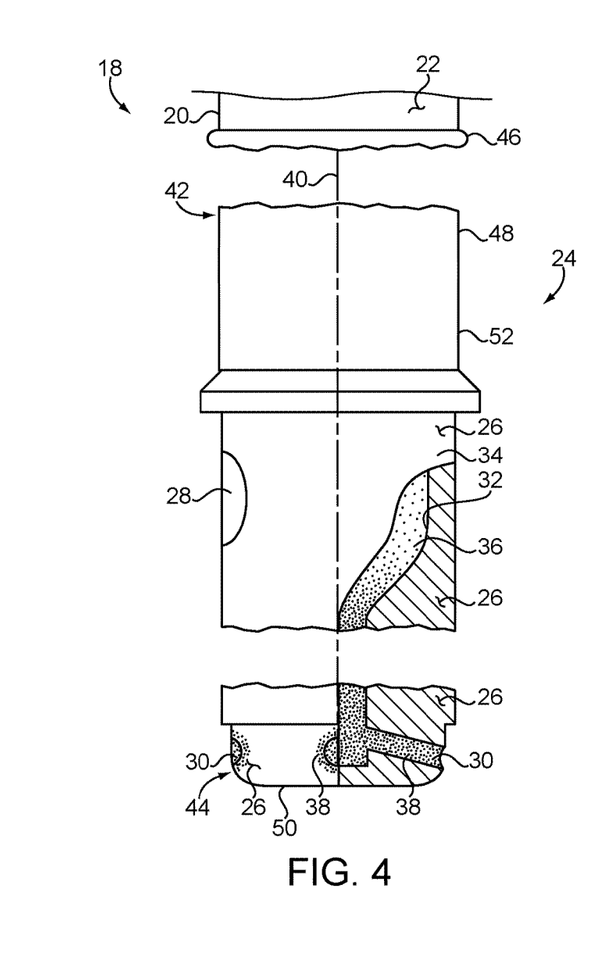
FIG. 4 is a partially sectioned diagrammatic view of a used prechamber device at one stage of processing for remanufacturing, according to one embodiment.

Used prechamber devices suitable for remanufacturing may be received after being removed from service in engine 10 on-site, or may be received by shipment or taking custody of warehoused prechamber devices 24, for instance. Referring now also to FIG. 4, a prechamber device 24 that has been decoupled from base 20 is shown. Prechamber device 24 may be decoupled from base 20 by cutting through a base weld 46 using any appropriate methods such as using a plasma cutter, torch, saw, or angle grinder. The process of decoupling prechamber device 24 from base 20 may result in the loss of material of body 52 due to the cutting of base weld 46. For example, in some embodiments, cutting through base weld 46 may reduce a length of body 52 at proximal end 42 that needs to be compensated for if specifications are to be maintained, as further discussed herein. In still other embodiments, decoupling prechamber device 24 may result in a negligible loss or no loss of material of body 52. As corrosion 38 may be concentrated in used tip 50, used tip 50 may be separated from prechamber device 24, leaving body 52 which may be suitable for remanufacture. Used tip 50 may encompass from about 15% to about 25% of an axial length 54 of prechamber device 24 from distal end 44. This 15-25% range contemplates a balancing of factors such as the desire to scrap as little viable body material 26 as possible while ensuring that enough of used prechamber device 24 is removed to get rid of concentrated corrosion 38. The amount of prechamber device 24 that forms used tip 50 may vary depending upon how corroded used prechamber device 24 is and the method used to remove used tip 50, amongst other considerations. As corrosion is deposited primarily on inner surfaces 32, quantitative analysis of the amount of used prechamber device 24 that makes up used tip 50 to be removed may be difficult and/or cost prohibitive. Precise location of the cut to remove used tip 50 within the disclosed range may be at least somewhat dependent upon a qualitative evaluation by a servicing technician such as the level of visible corrosion on outer surfaces 34 surrounding ignition outlets 30, length of time used prechamber device 24 was in service, or type of prior service environment, and/or design of prechamber device 24 itself. In some instances, discretion could be used to judge whether used prechamber device 24 is suitable for remanufacturing at all.

Figure 5:
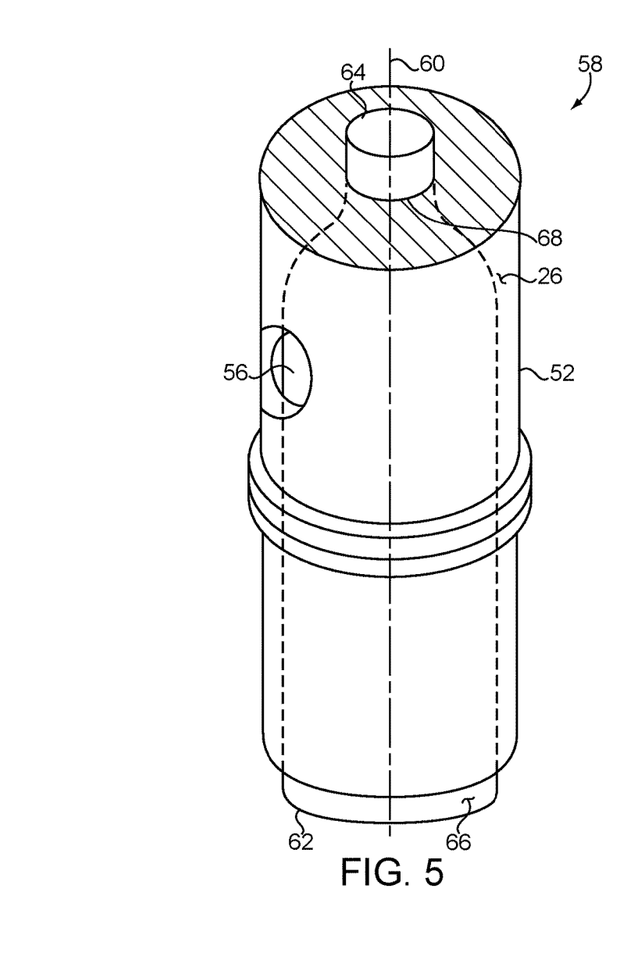
FIG. 5 is a diagrammatic view of a prechamber device body having a form positioned therein at one stage of processing for remanufacturing, according to one embodiment.

Referring now also to FIG. 5, a used body 52 suitable for remanufacturing is shown. Once a section of used prechamber device 24 suitable for reuse has been removed from base 20 and freed of surfaces 32, 34 having specification-violating corrosion, new tip 70 may be attached to body 52 to replace the used tip 50 that was removed. In the present embodiment, a bottle shaped form 56 may be placed within body 52 to form a body assembly 58. Form 56 defines a longitudinal axis 60, with form 56 having a wide end 62 and a narrow end 64. Form 56 may be formed of a form material 66 and may be structured to the desired dimensions of prechamber 36 such that narrow end 64 may protrude through a circular opening 68 defined by body 52 after used tip 50 has been removed. Form material 66 of the present embodiment may be graphite. In other embodiments, form material 66 may be any other material that may burn off at a lower temperature than body material 26 although the present disclosure is not thereby limited.

Figure 6:
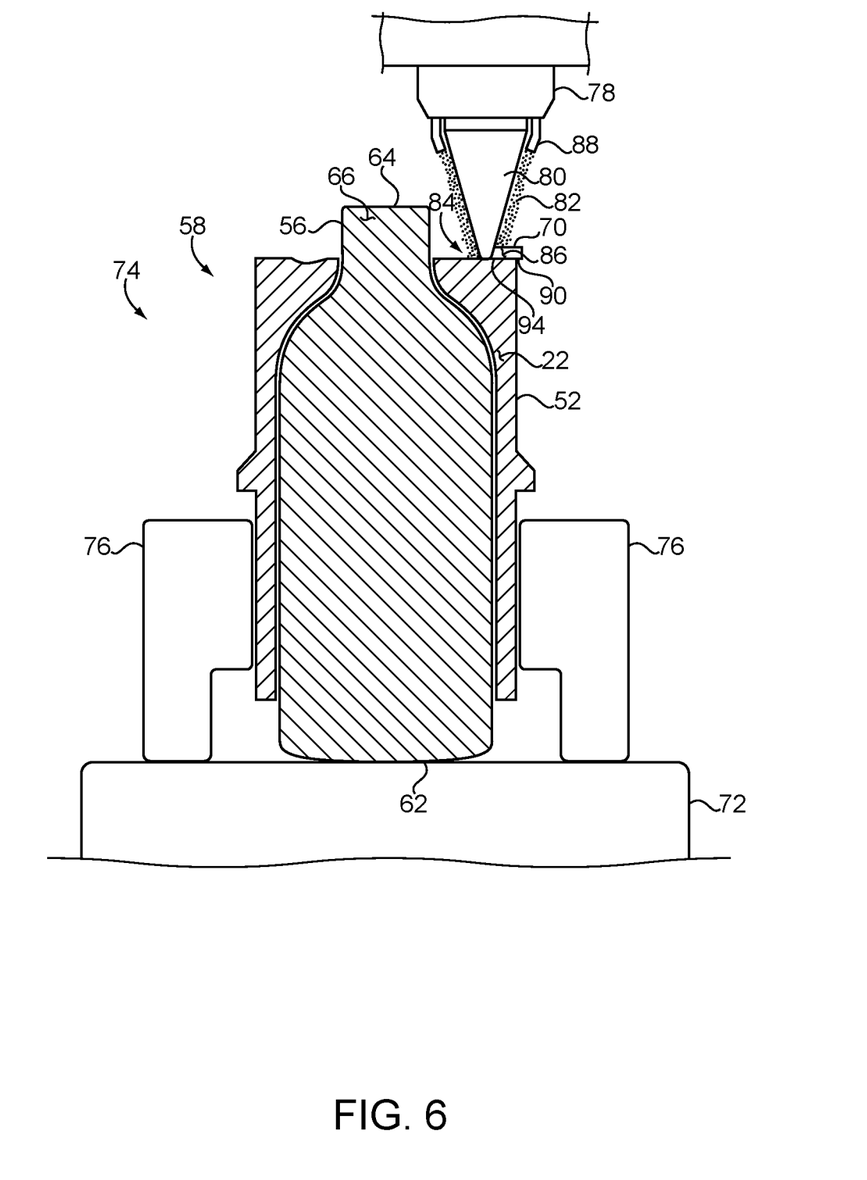
FIG. 6 is a sectioned diagrammatic view of a prechamber device body at one stage of processing for remanufacturing, according to one embodiment.

Referring now also to FIG. 6, a cross-sectional view of body assembly 58 is shown wherein body 52 is in the process of having new tip 70 deposited thereon. New tip 70 may be deposited on body 52 by laser welding. In alternative embodiments, new tip 70 may be coupled to body 52 by other means. For example, new tip 70 may be preformed of tip material 86 and bonded to base 20 by any suitable means such as laser welding or friction welding. Body assembly 58 may be positioned upon a fixture 72 of a welding station 74 and secured by at least one clamp 76. A laser 78 may be positioned at welding station 74 and structured to generate a laser beam 80 configured to melt a filler material at a melt zone 84, thereby depositing molten filler material on body 52. In the present embodiment, the filler material is tip material 86. Tip material 86 may be a highly temperature and corrosion-resistant material, and may include a nickel-chromium alloy, such as Inconel®, or a stainless steel. In some embodiments, tip material 86 may be the same type of material as body material 26 or may be any other type of suitable material. Tip material 86 may be powdered metal filler material that is sprayed in a spray plume 88 towards melt zone 84. In alternative embodiments, tip material 86 may be a wire or other solid form. In some embodiments, excess tip material 86 may be deposited to give new tip 70 a height or diameter, greater than a corresponding specification of used tip 50, and forming an overhang 90.

Figure 7:
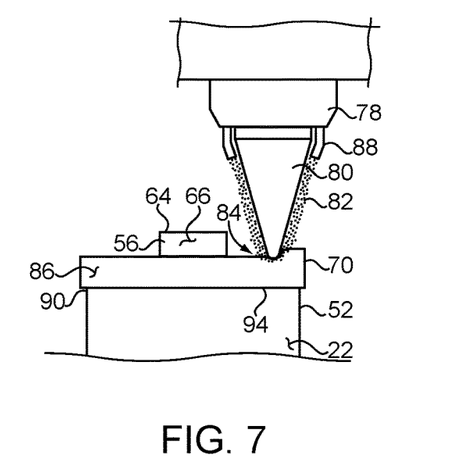
FIG. 7 is a diagrammatic view of a prechamber device body at another stage of processing for remanufacturing, according to one embodiment.
Figure 8:
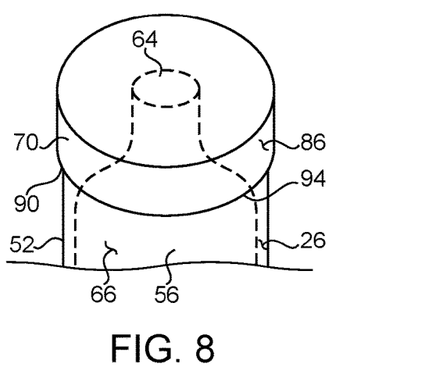
FIG. 8 is a diagrammatic view of a prechamber device body at yet another stage of processing for remanufacture, according to one embodiment.

Tip material 86 may be deposited on body 52 in a plurality of layers which may or may not be detectable once tip material 86 is solidified, a first layer being deposited directly on body 52 and each subsequent layer being deposited on a previously deposited layer. In alternative embodiments, tip material might be deposited by any other methods such as globbing the tip material on to the base. Tip material 86 deposited directly on body 52 may bond with body material 26 during deposition, forming a tip weld interface 94 wherein tip material 86 is mixed with and metallurgically bonded to body material 26. Tip weld interface 94 may be substantially planar, extending between body 52 and tip 70 at a substantially uniform axial location. Referring now also to FIG. 7, the deposition process is depicted at a stage more advanced than seen in FIG. 6. The deposition process may continue, with new layers of tip material 86 being deposited on top of previously deposited layers, until enough tip material 86 has been deposited to form new tip 70. In the present embodiment, deposition may continue at least until narrow end 64 of form 56 is covered. Referring now also to FIG. 8, new tip 70 is shown after deposition of new tip material 86 has been completed. As seen in FIG. 8, narrow end 64 is completely covered by deposited new tip material 86, forming tip 70.

Figure 9:
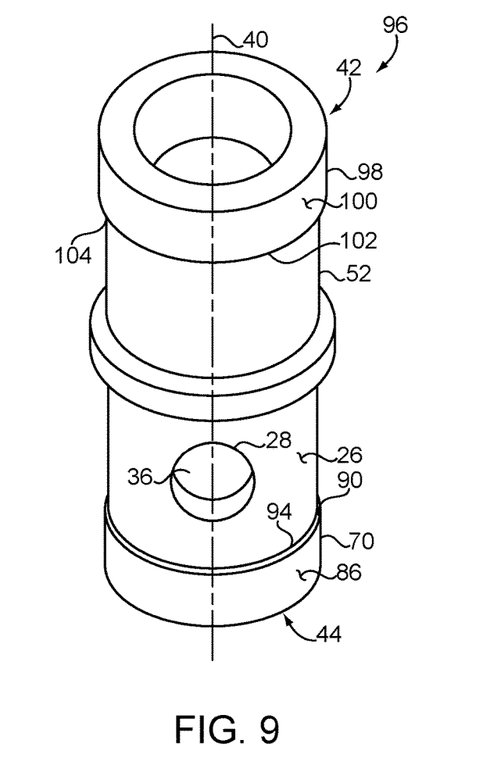
FIG. 9 is a diagrammatic view of a prechamber device body at yet another stage of processing for remanufacturing, according to one embodiment.

Turning now to FIG. 9, a remanufactured prechamber device 96 is shown. Remanufactured device 96 may define longitudinal axis 40 and include new tip 70 positioned at distal end 44, root 98 positioned at proximal end 42, and body 52 disposed therebetween. In some embodiments, remanufactured device 96 may not include root 98. The deposition process used to deposit new tip 70 to body 52 may also be used to deposit root 98 to body 52 by positioning body assembly 58 in welding station 74 such that laser 78 is positioned above wide end 62 of form 56, or at an analogous location if form 56 has yet to be placed within body 52 or has already been removed. Root 98 may be formed of and bonded to body 52 using root material 100. Root material 100 may be a powdered metal filler material sprayed in spray plume 88 towards body 52 and intersecting laser beam 80 at a melt zone. Root material 100 may include a nickel-chromium alloy, such as Inconel®, or a stainless steel. In some embodiments, root material 100 may have a similar material composition as body material 26 or may be any other type of material suitable for use in a prechamber device. Root material 100 of the present embodiment may have an identical material composition to tip material 86. Deposition of root 98 on body 52 may occur in layers, with a first layer of root material 100 bonding with body material 26 to form a root weld interface 102. In alternative embodiments, root 98 may be formed by alternative means analogous to forming of new tip 70. Root weld interface 102 may include body material 26 mixed with and metallurgically bonded to root material 100, and may be substantially planar and annular, extending between body 52 and root 98 at a substantially uniform axial location. Deposited root material 100 may produce, for example, an overhang 104. In some embodiments, excess root material 100 may be deposited to give root 98 a specification, such as height or diameter, greater than a corresponding specification of proximal end 42 of used prechamber device 24. Once root 98 and/or new tip 70 have been deposited on body 52, form 56 may be removed from body assembly 58. Removal of form 56 in the present embodiment may include heating body assembly 58 until form 56 burns off. In alternative embodiments, removal of form 56 may include slipping form 56 out of remanufactured device 96 or drilling or grinding the form out of the remanufactured device, or any other similar methods for removal.

Figure 10:
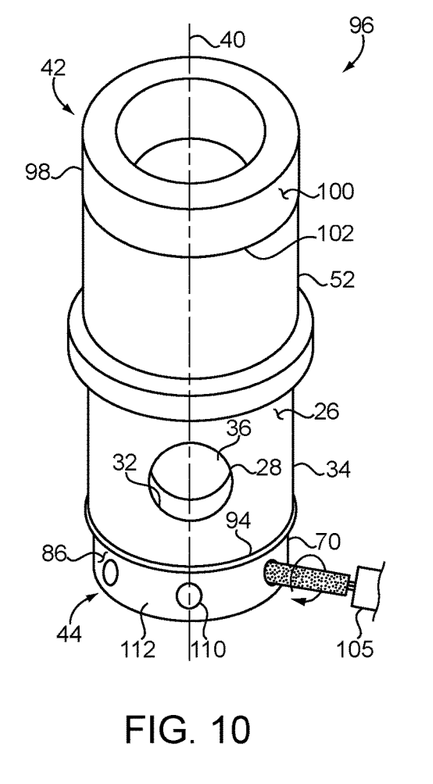
FIG. 10 is a diagrammatic view of a prechamber device body at yet another stage of processing for remanufacturing, according to one embodiment.

Those skilled in the field of remanufacturing will be familiar with the general principle of returning a used component to a condition as good or better than new as discussed above. For remanufactured parts, a set of tolerances and surface finishes known from newly manufactured parts will typically be applied to the remanufacturing of used parts. As such, the manner of repairing corroded used prechamber devices 24 to satisfy such a specification contemplates machining of materials 86, 100 that have been deposited on body 52. Referring now also to FIG. 10, machining of remanufactured device 96 is shown. During the deposition process, excess materials 86, 100 may be welded to remanufactured device 96 to provide ample material for machining. For example, excess tip material 86 may be deposited on body 52 to allow for new tip 70 to be machined to the same specifications as used tip 50. As also seen in FIG. 10, new ignition outlets 110 are bored into new tip 70 using a drill 105, or the like, to create a bore between a new inner surface 114 (shown in FIG. 3) and a new outer surface 112, thereby enabling conveyance of combustion gases from prechamber 36 to cylinder 16. Other surfaces 32, 34, 112, 114 of remanufactured device 96 may be machined or otherwise processed using any other tools and/or methods suitable for processing of materials 86, 100. Once specifications of remanufactured device 96 meet or are within an acceptable tolerance of specifications of prechamber device 24, remanufactured device 96 may be forwarded for any final inspections or treatments, packaged, shipped, etc. and returned to service.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features, and advantages will be apparent from an examination of the attached drawings and appended claims.

What is claimed is:

1. A method of making a prechamber ignition device for an internal combustion engine, the method comprising:
   receiving a used prechamber assembly removed from service in the internal combustion engine, the prechamber assembly including a used prechamber device having a body structured for positioning at least partially within an engine cylinder, and a base coupled to the body for mounting the prechamber assembly in the internal combustion engine;
   decoupling the used prechamber device from the base at least in part by cutting through a base weld attaching the used prechamber device to the base;
   removing a used tip from the body, the used tip defining at least one ignition outlet;
   attaching a new tip to the body in place of the used tip, the new tip being formed of a tip material compatible for welding with a body material of the body; and
   forming at least one new ignition outlet in the new tip.

2. The method of claim 1 wherein attaching the new tip to the body includes depositing tip material in a molten form onto the body material such that the tip material is mixed with and metallurgically bonds to the body material at a tip weld interface.

3. The method of claim 2 wherein depositing tip material in a molten form further includes melting powdered tip material in a powder metal spray plume directed toward the body of the prechamber device.

4. The method of claim 2 further comprising positioning a form within the body prior to the depositing of the tip material such that a portion of the form protrudes from the body, and wherein the depositing of the tip material further includes depositing the tip material onto the body such that the protruding portion of the form is covered by the deposited tip material.

5. The method of claim 4 further comprising molding the deposited tip material about the form, and removing the form from the body to produce an inner surface of the new tip shaped in a mirror image of the shape of the form.

6. The method of claim 5 wherein the form has a bottle shape and the inner surface of the new tip is shaped in a mirror image of a narrow end of the bottle shape.

7. The method of claim 1 wherein the tip material includes a nickel-chromium alloy or a stainless steel, and the body material includes a nickel-chromium alloy or a stainless steel, salvaged from the used prechamber device.

8. A method of making a prechamber ignition device for an internal combustion engine, the method comprising:
  receiving a used prechamber assembly removed from service in the internal combustion engine, the prechamber assembly including a used prechamber device having a body structured for positioning at least partially within an engine cylinder, and a base coupled to the body for mounting the prechamber assembly in the internal combustion engine;
  removing a used tip from the body, the used tip defining at least one ignition outlet;
  attaching a new tip to the body in place of the used tip, the new tip being formed of a tip material compatible for welding with a body material of the body;
  wherein attaching the new tip to the body includes depositing tip material in a molten form onto the body material such that the tip material is mixed with and metallurgically bonds to the body material at a tip weld interface; and
  forming at least one new ignition outlet in the new tip.

9. The method of claim 8 further comprising decoupling the used prechamber device from the base at least in part by cutting through a base weld attaching the used prechamber device to the base.

* * * * *